(12) United States Patent
Huang et al.

(10) Patent No.: US 12,475,012 B2
(45) Date of Patent: Nov. 18, 2025

(54) MULTI-CORE PROCESSING CIRCUIT AND TEST METHOD OF THE SAME HAVING POWER-STABILIZING TEST MECHANISM

(71) Applicant: REALTEK SEMICONDUCTOR CORPORATION, Hsinchu (TW)

(72) Inventors: Ching-Feng Huang, Hsinchu (TW); Yu-Cheng Lo, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 146 days.

(21) Appl. No.: 18/196,637

(22) Filed: May 12, 2023

(65) Prior Publication Data
US 2023/0376394 A1  Nov. 23, 2023

(30) Foreign Application Priority Data
May 17, 2022 (TW) .................... 111118439

(51) Int. Cl.
*G06F 11/27* (2006.01)
*G06F 11/273* (2006.01)

(52) U.S. Cl.
CPC ............ *G06F 11/27* (2013.01); *G06F 11/273* (2013.01)

(58) Field of Classification Search
CPC .............................. G06F 11/27; G06F 11/273
See application file for complete search history.

(56) References Cited

U.S. PATENT DOCUMENTS

| | | | |
|---|---|---|---|
| 7,734,975 B2 * | 6/2010 | Anzou | G01R 31/31721 714/733 |
| 2010/0262879 A1 | 10/2010 | Floyd | |
| 2012/0030509 A1 * | 2/2012 | Wood | G11C 29/4401 714/E11.113 |
| 2020/0409450 A1 * | 12/2020 | Hovis | G06F 1/3296 |
| 2021/0357014 A1 | 11/2021 | Zhang | |

FOREIGN PATENT DOCUMENTS

| | | |
|---|---|---|
| CN | 109344018 A | 2/2019 |
| TW | 202013134 A | 4/2020 |

OTHER PUBLICATIONS

OA letter of a counterpart TW application (appl. no. 111118439) mailed on Jan. 30, 2023.

* cited by examiner

*Primary Examiner* — Bryce P Bonzo
*Assistant Examiner* — Audrey Emma Whitesell
(74) *Attorney, Agent, or Firm* — WPAT, PC

(57) ABSTRACT

The present disclosure discloses a multi-core processing circuit having power-stabilizing test mechanism that includes a plurality of core-processing circuits arranged in an order and a self-test scheduling circuit. Each of the core-processing circuits includes a memory built-in self-test circuit. The self-test scheduling circuit receives a main activation signal to activate the memory built-in self-test circuit of one of the core-processing circuits every delay time in the order based on signal handshake to perform self-test, wherein one of the activated core-processing circuits has a largest average power draining amount in a predetermined range within the delay time.

2 Claims, 4 Drawing Sheets

MULTI-CORE PROCESSING CIRCUIT AND TEST METHOD OF THE SAME HAVING POWER-STABILIZING TEST MECHANISM

BACKGROUND OF THE INVENTION

1. Field of the Invention

The present disclosure relates to a multi-core processing circuit and a test method of the same having power-stabilizing test mechanism.

2. Description of Related Art

A multi-core processing circuit is a calculating unit that includes two or more than two independent physical central processing units to execute programs or commands independently to speed up the execution of the programs through parallel computing.

For a processing circuit, a memory built-in self-test circuit is a crucial test component to perform self-test without depending on external test equipments. However, for a multi-core processing circuit, each of the core-processing circuits therein requires an internal memory built-in self-test circuit to perform self-test. If the power of the multi-core processing circuit decreases due to the self-test performed simultaneously by too many circuits, the signal level of the signals transmitted during the test process may drop as well. A false test result may be generated accordingly.

SUMMARY OF THE INVENTION

In consideration of the problem of the prior art, an object of the present disclosure is to provide a multi-core processing circuit and a test method of the same having power-stabilizing test mechanism.

The present invention discloses a multi-core processing circuit having power-stabilizing test mechanism that includes a plurality of core-processing circuits and a self-test scheduling circuit. The core-processing circuits are arranged in an order and each including a memory built-in self-test circuit. The self-test scheduling circuit is configured to receive a main activation signal to activate the memory built-in self-test circuit of one of the core-processing circuits every delay time in the order based on a signal handshake process to perform self-test, wherein one of the activated core-processing circuits has an average power draining amount in a predetermined range within the delay time.

The present invention also discloses a test method having power-stabilizing test mechanism used in a multi-core processing circuit, wherein the multi-core processing circuit includes a self-test scheduling circuit and a plurality of core-processing circuits arranged in an order and each comprising a memory built-in self-test circuit. The test method includes steps outlined below. A main activation signal is received by the self-test scheduling circuit. The memory built-in self-test circuit of one of the core-processing circuits is activated by the self-test scheduling circuit every delay time in the order based on a signal handshake process to perform self-test, wherein one of the activated core-processing circuits has an average power draining amount in a predetermined range within the delay time.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a multi-core processing circuit and a test method of the same having power-stabilizing test mechanism to individually activate the memory built-in self-test circuit of each of the core-processing circuits by using a signal handshake process without the need to dispose any delay element, so as to avoid the large power voltage drop due to the simultaneous activation of too many circuits and increase the stability of self-test process.

Figure 1:
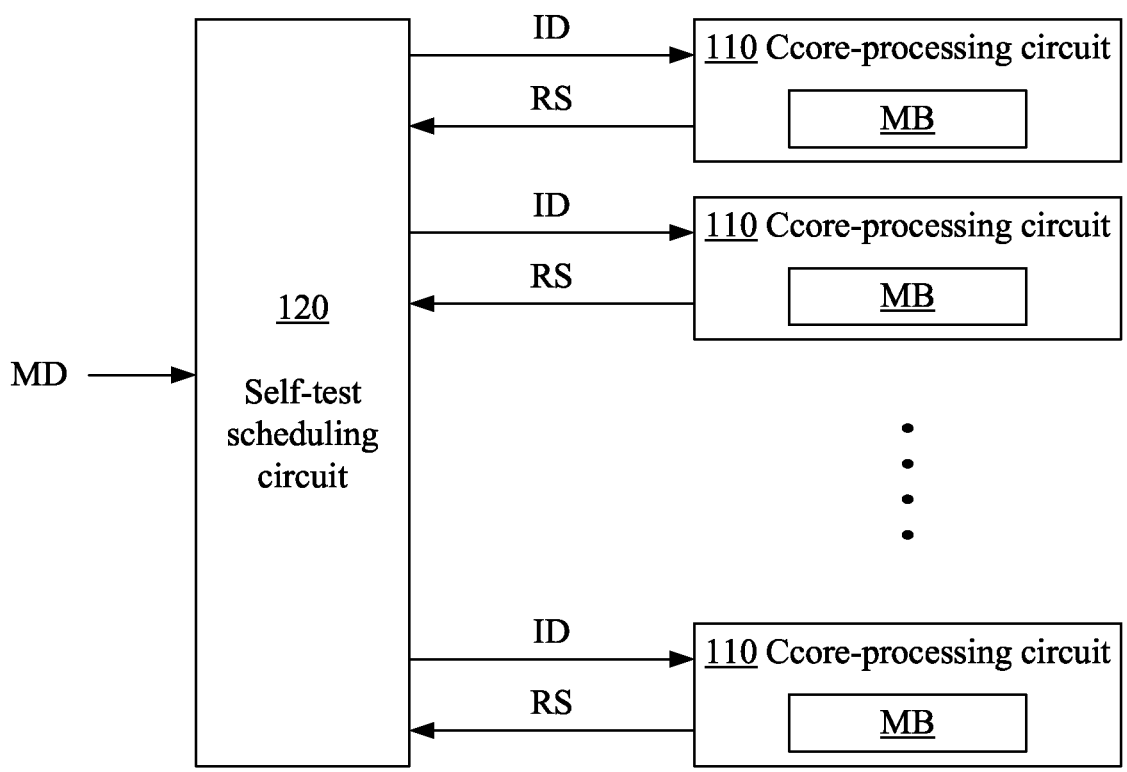
FIG. 1 illustrates a block diagram of a multi-core processing circuit having power-stabilizing test mechanism according to an embodiment of the present invention.

Reference is now made to FIG. 1. FIG. 1 illustrates a block diagram of a multi-core processing circuit 100 having power-stabilizing test mechanism according to an embodiment of the present invention. The multi-core processing circuit 100 includes a plurality of core-processing circuits 110 arranged in an order and a self-test scheduling circuit 120.

Each of the core-processing circuits 110 includes a memory built-in self-test circuit MB labeled as MB in FIG. 1. It is appreciated that each of the core-processing circuits 110 may further include such as, but not limited to a processor, a memory that serves as the test subject of the memory built-in self-test circuit MB and other components. In order to keep the diagram simple, the additional components described above are not illustrated in FIG. 1.

The memory built-in self-test circuit MB, after being activated, may generate test patterns by itself according to built-in logic circuits to perform test on the memory in the core-processing circuits 110 and perform comparison on a test result and the test pattern to determine whether the test result is correct.

The self-test scheduling circuit 120 is configured to receive a main activation signal MD. The main activation signal MD may be generated by such as, but not limited to test equipment (not illustrated in the figure) electrically coupled to the multi-core processing circuit 100.

After receiving the main activation signal MD, the self-test scheduling circuit 120 activates the memory built-in self-test circuit MB of one of the core-processing circuits 110 every delay time in the order based on a signal handshake process to perform self-test, wherein one of the activated core-processing circuits 110 has an average power draining amount in a predetermined range within the delay time.

The signal handshake process described above is configured to transmit an individual activation signal ID by the self-test scheduling circuit 120 to the memory built-in self-test circuit MB of one of the core-processing circuits 110 to activate the memory built-in self-test circuit MB.

After the self-test scheduling circuit 120 receives a response signal RS generated by the memory built-in self-test circuit MB, the self-test scheduling circuit 120 transmits the individual activation signal ID to the memory built-in self-test circuit MB of a next one of the core-processing circuits 110 until the memory built-in self-test circuit MB of all the core-processing circuits 110 are activated. A time difference between the transmission of the individual activation signal ID and the receiving of the response signal RS corresponding to the same memory built-in self-test circuit MB performed by the self-test scheduling circuit 120 is the delay time.

For example, when a number of the core-processing circuits 110 is N, after receiving the main activation signal MD, the self-test scheduling circuit 120 generates the individual activation signal ID to the memory built-in self-test circuit MB of the 1st core-processing circuit 110 to activate the memory built-in self-test circuit MB thereof. When the memory built-in self-test circuit MB of the 1st core-processing circuit 110 generates the response signal RS, the self-test scheduling circuit 120 generates the individual activation signal ID to the memory built-in self-test circuit MB of the 2nd the core-processing circuit 110 to activate the memory built-in self-test circuit MB thereof. When the memory built-in self-test circuit MB of the 2nd core-processing circuit 110 generates the response signal RS, the self-test scheduling circuit 120 generates the individual activation signal ID to the memory built-in self-test circuit MB of the 3rd the core-processing circuit 110 to activate the memory built-in self-test circuit MB thereof, so on and so forth.

After the self-test scheduling circuit 120 generates the individual activation signal ID to the memory built-in self-test circuit MB of the n-th core-processing circuit 110, no more individual activation signal ID is generated.

In an embodiment, the memory built-in self-test circuit MB, after being activated, starts to perform self-test and generates the response signal RS after a predetermined test stage terminates. As a result, the delay time equals to the time consumed during the initiation of the self-test to the termination of the predetermined test stage. The activated core-processing circuit 110 has an average power draining amount in a predetermined range within the delay time during the self-test. In an embodiment, the average power draining amount is determined by an average power voltage drop.

Figure 2A:
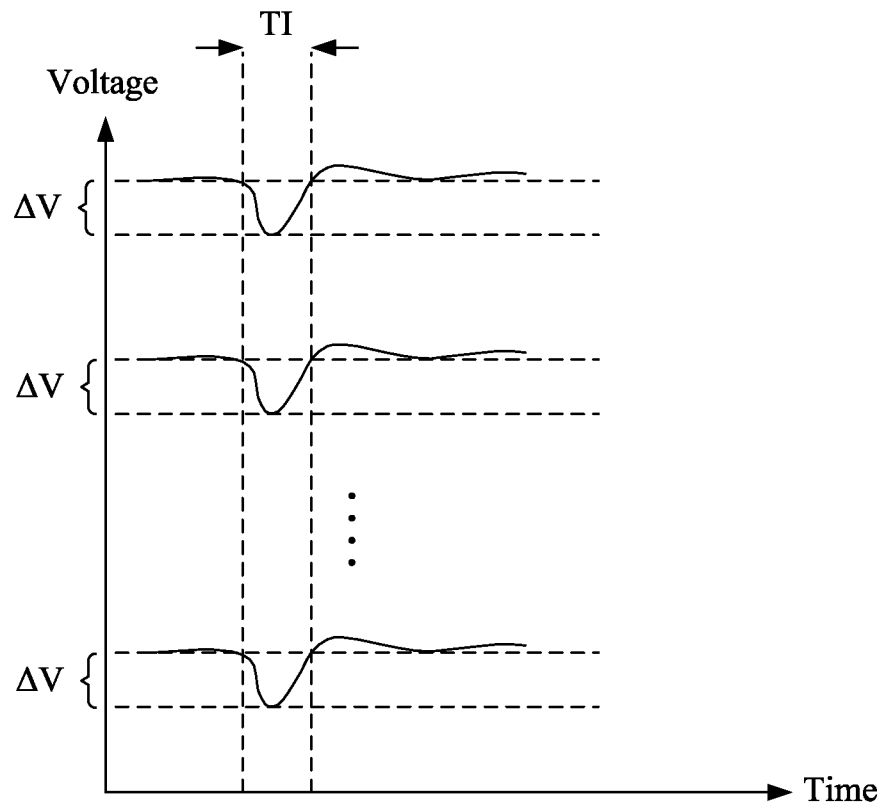
FIG. 2A illustrates a waveform diagram of the power of each of the core-processing circuits when the N core-processing circuits are activated without any delay time according to an embodiment of the present invention.
Figure 2B:
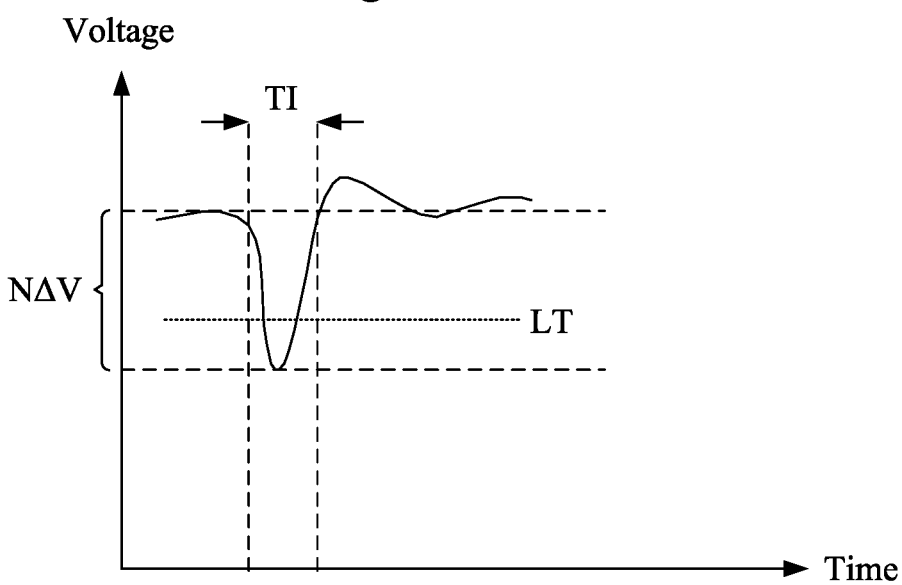
FIG. 2B illustrates a waveform diagram of the power of the whole multi-core processing circuit when the N core-processing circuits are activated without any delay time according to an embodiment of the present invention.

Reference is now made to FIG. 2A and FIG. 2B at the same time. FIG. 2A illustrates a waveform diagram of the power of each of the core-processing circuits 110 when the N core-processing circuits 110 are activated without any delay time according to an embodiment of the present invention. FIG. 2B illustrates a waveform diagram of the power of the whole multi-core processing circuit 100 when the N core-processing circuits 110 are activated without any delay time according to an embodiment of the present invention.

In FIG. 2A and FIG. 2B, the X-axis corresponds to time, and the Y-axis corresponds to voltage. It is appreciated that, in order to easily perform comparison based on time, the waveforms of the powers of a multiple of core-processing circuits 110 are illustrated together along the Y-axis in FIG. 2A. The amount each of the powers is the same.

As illustrated in FIG. 2A, all the core-processing circuits 110 are activated simultaneously to drain power since the core-processing circuits 110 are activated without any delay time. The core-processing circuits 110 drain more power when the self-test is started to be performed such that a power voltage drop having a maximum value of $\Delta V$ is generated for each of the core-processing circuits 110 within the time period T1. The voltage becomes stable when the predetermined test stage terminates.

As a result, as illustrated in FIG. 2B, the power of the whole multi-core processing circuit 100 in the time period T1 has a total power voltage drop of $N\Delta V$ that is the sum of the power voltage drops, each having the maximum value of $\Delta V$, of the N core-processing circuits 110 that simultaneously drain power.

Under such a condition, since the value $N\Delta V$ of the instant total power voltage drop is too large, the signal voltage level is easily affected and drops accordingly. The signal voltage level may even drop to a level below a lowest threshold value LT such that a test result that supposes to be accurate becomes an error to fail the test. However, if such an issue is addressed by increasing the power of the whole system, the margin of the voltage becomes smaller and the yield of the circuits is affected accordingly.

Figure 3A:
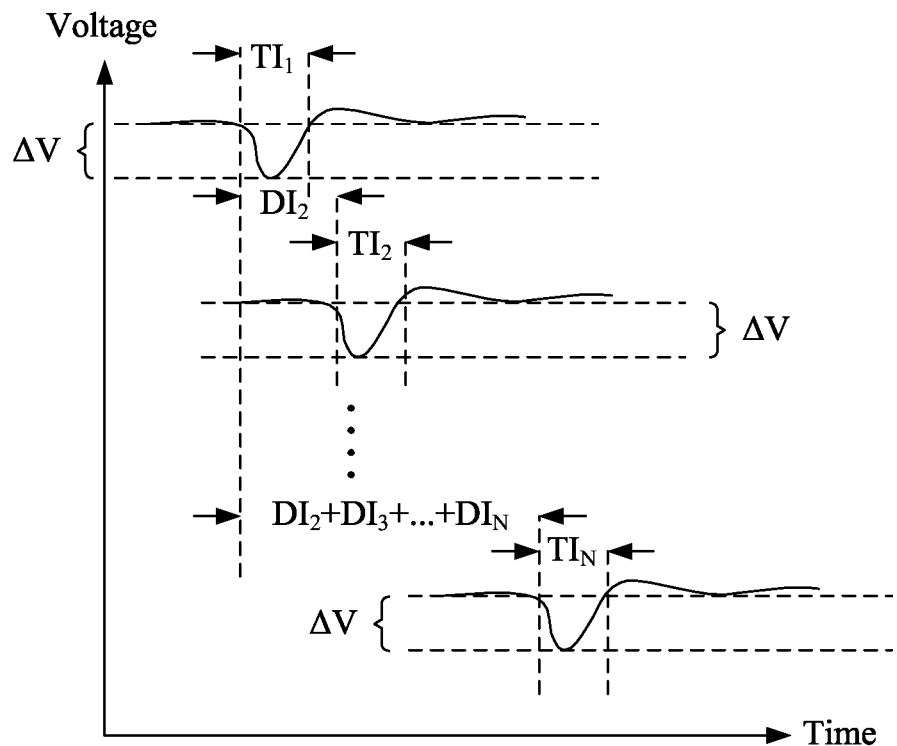
FIG. 3A illustrates a waveform diagram of the power of each of the core-processing circuits when the N core-processing circuits are activated with delay times according to an embodiment of the present invention.
Figure 3B:
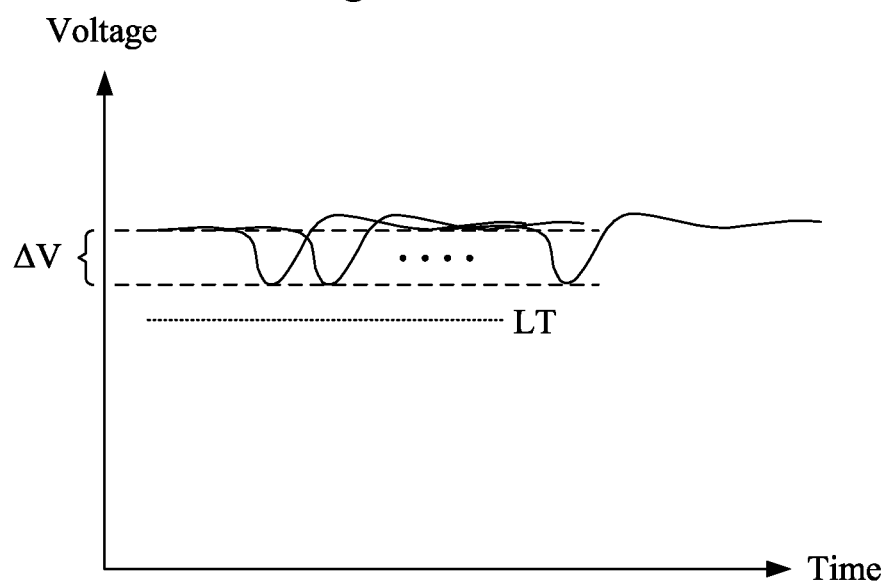
FIG. 3B illustrates a waveform diagram of the power of the whole multi-core processing circuit when the N core-processing circuits are activated with delay times according to an embodiment of the present invention.

Reference is now made to FIG. 3A and FIG. 3B at the same time. FIG. 3A illustrates a waveform diagram of the power of each of the core-processing circuits 110 when the N core-processing circuits 110 are activated with delay times according to an embodiment of the present invention. FIG. 3B illustrates a waveform diagram of the power of the whole multi-core processing circuit 100 when the N core-processing circuits 110 are activated with delay times according to an embodiment of the present invention.

In FIG. 3A and FIG. 3B, the X-axis corresponds to time, and the Y-axis corresponds to voltage. It is appreciated that, in order to easily perform comparison based on time, the waveforms of the powers of a multiple of core-processing circuits 110 are illustrated together along the Y-axis in FIG. 3A. The amount each of the powers is the same.

As illustrated in FIG. 3A, the times that each two of the neighboring core-processing circuits 110 drain power are distanced by one of the delay time $DI_2 \sim DI_N$ since the core-processing circuits 110 are individually activated with the delay times $DI_2 \sim DI_N$. Each of the power voltage drops having the maximum value of $\Delta V$ is generated within one of the time periods $TI_1 \sim TI_N$. The voltage of each of the core-processing circuits 110 becomes stable when the predetermined test stage terminates.

As a result, as illustrated in FIG. 3B, the maximum value of the total power voltage drop of the whole multi-core processing circuit 100 can be kept around the maximum value of $\Delta V$ that each of the core-processing circuits 110 corresponds to under the condition that the delay times are properly set since the core-processing circuits 110 are activated individually. Such a maximum value of the total power voltage drop can be kept above the lowest threshold value LT such that the test result remains accurate to pass the test.

As described above, the time length of the delay time corresponds to the termination of the predetermined test stage. In an embodiment, the self-test scheduling circuit 120 starts to activate the memory built-in self-test circuit MB of each of the core-processing circuits 110 to perform self-test from the delay time having a time length of 0, increases the time length of the delay time in a step-wise manner when the self-test fails and sets a test stage that the delay time corresponds to as the predetermined test stage when the self-test passes. By using the method described above, an optimal length of the delay time as illustrated in FIG. 3B can be determined by the self-test scheduling circuit 120.

By using the method described above, the multi-core processing circuit individually activates the memory built-in self-test circuit of each of the core-processing circuits by using a signal handshake process without the need to dispose any delay element, so as to avoid the large power voltage drop due to the simultaneous activation of too many circuits and increase the stability of self-test process.

Figure 4:
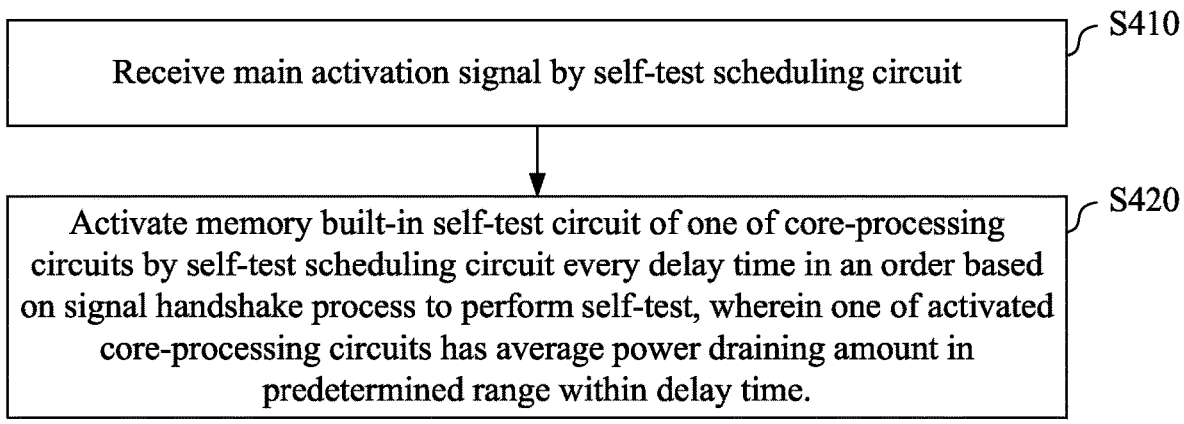
FIG. 4 illustrates a flow chart of a test method having power-stabilizing test mechanism according to an embodiment of the present invention.

Reference is now made to FIG. 4. FIG. 4 illustrates a flow chart of a test method 400 having power-stabilizing test mechanism according to an embodiment of the present invention.

Besides the apparatus described above, the present invention further discloses the test method 400 that can be used in such as, but not limited to the multi-core processing circuit 100 illustrated in FIG. 1. An embodiment of the test method 400 is illustrated in FIG. 4 and includes the steps outlined below.

In step S410, the main activation signal MD is received by the self-test scheduling circuit 120.

In step S420, the memory built-in self-test circuit MB of one of the core-processing circuits 100 is activated by the self-test scheduling circuit 120 every delay time in the order based on the signal handshake process to perform self-test, wherein one of the activated core-processing circuits 110 has the average power draining amount in the predetermined range within the delay time.

It is appreciated that the embodiments described above are merely an example. In other embodiments, it is appreciated that many modifications and changes may be made by those of ordinary skill in the art without departing, from the spirit of the invention.

In summary, the multi-core processing circuit and the test method of the same having power-stabilizing test mechanism of the present invention individually activate the memory built-in self-test circuit of each of the core-processing circuits by using a signal handshake process without the need to dispose any delay element, so as to avoid the large power voltage drop due to the simultaneous activation of too many circuits and increase the stability of self-test process.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A multi-core processing circuit having power-stabilizing test mechanism comprising:
    a plurality of core-processing circuits arranged in an order and each comprising a memory built-in self-test circuit; and
    a self-test scheduling circuit configured to receive a main activation signal to activate the memory built-in self-test circuit of one of the core-processing circuits every delay time in the order based on a signal handshake process to perform self-test, wherein one of the activated core-processing circuits has an average power draining amount in a predetermined range within the delay time, and wherein the average power draining amount is determined by an average power voltage drop;
    wherein the signal handshake process is configured to transmit an individual activation signal by the self-test scheduling circuit to the memory built-in self-test circuit of one of the core-processing circuits to activate the memory built-in self-test circuit, to receive a response signal generated, after a predetermined test stage terminates, by the memory built-in self-test circuit by the self-test scheduling circuit and to transmit the individual activation signal to the memory built-in self-test circuit of a next one of the core-processing circuits by the self-test scheduling circuit until the memory built-in self-test circuit of all the core-processing circuits are activated, and a time difference between the transmission of the individual activation signal and the receiving of the response signal corresponding to the same memory built-in self-test circuit is the delay time; and
    wherein the self-test scheduling circuit starts to activate the memory built-in self-test circuit of each of the core-processing circuits to perform self-test from the delay time having a time length of 0, increases the time length of the delay time in a step-wise manner when the self-test fails and sets a test stage that the delay time corresponds to as the predetermined test stage when the self-test passes.

2. A test method having power-stabilizing test mechanism used in a multi-core processing circuit, wherein the multi-core processing circuit comprises a self-test scheduling circuit and a plurality of core-processing circuits arranged in an order and each comprising a memory built-in self-test circuit, the test method comprising:
    receiving a main activation signal by the self-test scheduling circuit; and
    activating the memory built-in self-test circuit of one of the core-processing circuits by the self-test scheduling circuit every delay time in the order based on a signal handshake process to perform self-test, wherein one of the activated core-processing circuits has an average power draining amount in a predetermined range within the delay time, and wherein the average power draining amount is determined by an average power voltage drop, wherein the signal handshake process comprises:
        transmitting an individual activation signal by the self-test scheduling circuit to the memory built-in self-test circuit of one of the core-processing circuits to activate the memory built-in self-test circuit; and
        receiving a response signal generated, after a predetermined test stage terminates, by the memory built-in self-test circuit by the self-test scheduling circuit and transmitting the individual activation signal to the memory built-in self-test circuit of a next one of the core-processing circuits by the self-test scheduling circuit until the memory built-in self-test circuit of all the core-processing circuits are activated, wherein a time difference between the transmission of the individual activation signal and the receiving of the response signal corresponding to the same memory built-in self-test circuit is the delay time;
    wherein the test method further comprises:
        starting to activate the memory built-in self-test circuit of each of the core-processing circuits to perform self-test from the delay time having a time length of 0 by the self-test scheduling circuit;
        increasing the time length of the delay time in a step-wise manner by the self-test scheduling circuit when the self-test fails; and setting a test stage that the delay time corresponds to as the predetermined test stage by the self-test scheduling circuit when the self-test passes.

\* \* \* \* \*